(12) United States Patent
Lee

(10) Patent No.: US 9,959,811 B2
(45) Date of Patent: May 1, 2018

(54) SENSING UNIT, FLEXIBLE DEVICE, AND DISPLAY DEVICE

(71) Applicant: SAMSUNG DISPLAY CO., LTD., Yongin-si, Gyeonggi-do (KR)

(72) Inventor: Eun-Jung Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days. days.

(21) Appl. No.: 15/073,515

(22) Filed: Mar. 17, 2016

(65) Prior Publication Data

US 2016/0203763 A1 Jul. 14, 2016

Related U.S. Application Data

(62) Division of application No. 13/897,235, filed on May 17, 2013, now abandoned.

(30) Foreign Application Priority Data

Sep. 6, 2012 (KR) ........................ 10-2012-0098821

(51) Int. Cl.
*G09G 3/3275* (2016.01)
*G06F 3/01* (2006.01)
*G06F 3/041* (2006.01)
*G09G 3/3225* (2016.01)
*G06F 3/044* (2006.01)

(52) U.S. Cl.
CPC ............. *G09G 3/3275* (2013.01); *G06F 3/01* (2013.01); *G06F 3/044* (2013.01); *G06F 3/0416* (2013.01); *G09G 3/3225* (2013.01); *G06F 2203/04102* (2013.01); *G09G 2300/0426* (2013.01); *G09G 2300/0809* (2013.01); *G09G 2380/02* (2013.01)

(58) Field of Classification Search
CPC .............. G09G 3/3275; G09G 3/3225; G09G 2300/0426; G09G 2380/02; G09G 2300/0809; G06F 3/01; G06F 3/0416; G06F 3/044; G06F 2203/04102
See application file for complete search history.

(56) References Cited

U.S. PATENT DOCUMENTS

| | | |
|---|---|---|
| 5,086,785 A | 2/1992 | Gentile et al. |
| 2003/0227441 A1* | 12/2003 | Hioki .................... G06F 3/0412 345/156 |
| 2010/0182026 A1 | 7/2010 | Jakli et al. |
| 2011/0095974 A1* | 4/2011 | Moriwaki ............. G09G 3/007 345/156 |
| 2011/0096025 A1 | 4/2011 | Slobodin et al. |
| 2012/0256720 A1 | 10/2012 | Byun et al. |
| 2013/0031987 A1 | 2/2013 | Beauvais et al. |
| 2013/0050126 A1 | 2/2013 | Kimura et al. |
| 2013/0106441 A1 | 5/2013 | Yilmaz et al. |

FOREIGN PATENT DOCUMENTS

| | | |
|---|---|---|
| JP | 2003-015795 | 1/2003 |
| KR | 10-2012-0056512 A | 6/2012 |

* cited by examiner

*Primary Examiner* — Abhishek Sarma
(74) *Attorney, Agent, or Firm* — Lewis Roca Rothgerber Christie LLP

(57) ABSTRACT

A sensing unit measuring a bending degree of a flexible substrate includes: a first line formed on the flexible substrate; a second line adjacent to the first line; and a first controller applying a first sensing signal to the first line and measuring a change of crosstalk generated in the second line by the first sensing signal according to bending of the flexible substrate.

3 Claims, 11 Drawing Sheets

103

(a)

(b)

1005

SENSING UNIT, FLEXIBLE DEVICE, AND DISPLAY DEVICE

CROSS-REFERENCE TO RELATED APPLICATION

This application is a divisional of U.S. application Ser. No. 13/897,235, filed on May 17, 2013, which claims priority to and the benefit of Korean Patent Application No. 10-2012-0098821, filed in the Korean Intellectual Property Office on Sep. 6, 2012, the entire contents of all of which are incorporated herein by reference.

BACKGROUND

1. Field

The described technology relates generally to a sensing unit, a flexible device, and a display device. More particularly, the described technology relates generally to a sensing unit sensing a bending degree of a flexible substrate, a flexible device, and a display device.

2. Description of the Related Art

Recently, an organic light emitting diode (OLED) display has received much attention as a display device for displaying images.

Unlike a liquid crystal display (LCD) device, the OLED display is a self-emission device that can eliminate the necessity for a light source, and thus can be fabricated to be thinner and lighter. Also, the OLED display has other desired quality characteristics such as low power consumption, high luminance, high response speed, and the like.

Recently, by including a flexible substrate, a display device that is entirely flexible has been developed.

The above information disclosed in this Background section is only for enhancement of understanding of the background of the described technology and therefore it may contain information that does not form the prior art that is already known in this country to a person of ordinary skill in the art.

SUMMARY

An aspect of an embodiment of the present invention is directed toward a sensing unit that efficiently measures a bending degree of a flexible substrate, a flexible device, and a display device.

The sensing unit measuring a bending degree of a flexible substrate according to an embodiment of the present invention includes: a first line formed on the flexible substrate; a second line adjacent to the first line; and a first controller applying a first sensing signal to the first line and measuring a change of crosstalk generated in the second line by the first sensing signal according to a bending of the flexible substrate.

The first line and the second line may extend on the flexible substrate in a first direction.

The first line and the second line may be positioned with a same layer.

The sensing unit may further include: a third line positioned on the flexible substrate and extending in a second direction crossing the first direction; a fourth line adjacent to the third line and extending in the second direction; and a second controller applying a second sensing signal to the third line and measuring the crosstalk generated in the fourth line by the second sensing signal.

The third line and the fourth line may be positioned with a same layer.

The first line may extend in the first direction on the flexible substrate, and the second line may extend in the second direction crossing the first direction on the flexible substrate.

The first line and the second line may be positioned with different layers via an insulation layer interposed therebetween.

The first controller may include: a first sub-controller applying the first sensing signal to the first line; and a second sub-controller separated from the first sub-controller and applying the second sensing signal to the second line, wherein the first sub-controller may measure a change of the crosstalk generated in the first line by the second sensing signal according to the bending of the flexible substrate, and the second sub-controller may measure a change of the crosstalk generated in the second line by the first sensing signal according to the bending of the flexible substrate.

Also, an embodiment of the present invention provides a flexible device including a flexible substrate and the sensing unit.

Further, a display device according to an embodiment of the present invention includes: a flexible substrate; a first line positioned on the flexible substrate and connected to a pixel displaying an image; a second line adjacent to the first line; and a first pixel driver applying a first sensing signal to the first line and measuring a change of crosstalk generated in the second line by the first sensing signal according to a bending of the flexible substrate.

The first line and the second line may extend in a first direction on the flexible substrate, and the first pixel driver may selectively apply a gate signal to the first line.

The first line and the second line may be positioned with a same layer.

A third line positioned on the flexible substrate, extending in a second direction crossing the first direction, and connected to the pixel, a fourth line adjacent to the third line and extending in the second direction, and a second pixel driver applying the second sensing signal to the third line and measuring the crosstalk generated in the fourth line by the second sensing signal may be further included.

The pixel may be positioned at a portion where the first line and the third line cross.

The third line and the fourth line may be positioned with a same layer, and the second pixel driver may apply a data signal to the third line.

The first line may extend in the first direction on the flexible substrate, and the second line may extend in the second direction crossing the first direction on the flexible substrate and is connected to the pixel.

The pixel may be positioned at a portion where the first line and the third line cross.

The first line and the second line may be positioned with different layers via an insulation layer interposed therebetween.

The first pixel driver may include: a first sub-pixel driver applying a first sensing signal and selectively a gate signal to the first line; and a second sub-pixel driver applying a second sensing signal and selectively a data signal to the second line and separated from the first sub-pixel driver, wherein the first sub-pixel driver may measure a change of the crosstalk generated in the first line by the second sensing signal according to the bending of the flexible substrate, and the second sub-pixel driver may measure a change of the crosstalk generated in the second line by the first sensing signal according to the bending of the flexible substrate.

The first line and the second line may be positioned with different layers via an insulation layer interposed therebetween.

According to exemplary embodiments, the sensing unit efficiently measuring the bending degree of the flexible substrate, the flexible device including the same, and the display device including the same are provided.

DETAILED DESCRIPTION

Figure 1:
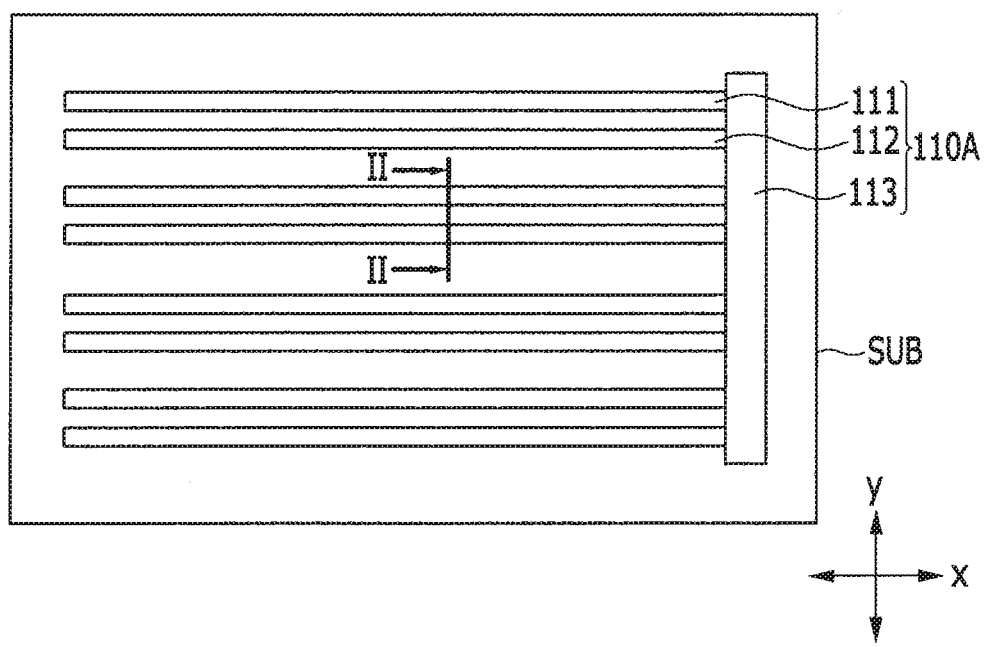
FIG. 1 is a view of a flexible device according to a first exemplary embodiment

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify the present invention, parts that are not connected with the description will be omitted, and the same elements or equivalents are referred to by the same reference numerals throughout the specification.

In describing the exemplary embodiments, the same reference numerals are used for elements having the same constructions and that are representatively described in a first exemplary embodiment, and in other remaining exemplary embodiments, only different constructions from those of the first exemplary embodiment will be described.

The size and thickness of each element are arbitrarily shown in the drawings, and the present invention is not necessarily limited thereto.

In the drawings, the thickness of layers, films, panels, regions, etc., are exaggerated for clarity. Also, in the drawings, the thickness of some layers and regions are exaggerated for the sake of brevity. It will be understood that when an element such as a layer, film, region, or substrate is referred to as being "on" another element, it can be directly on the other element or one or more intervening elements may also be present therebetween.

In addition, unless explicitly described to the contrary, the word "comprise" and variations such as "comprises" or "comprising" will be understood to imply the inclusion of stated elements but not the exclusion of any other elements.

Further, throughout the specification, "on" implies being positioned above or below a target element, and does not imply being necessarily positioned on the top on the basis of a gravity direction.

A flexible device that will be described may be a touch panel including a flexible substrate, a touch sheet, an organic light emitting diode (OLED) display, or a liquid crystal display (LCD).

Here, a flexible device according to a first exemplary embodiment will be described with reference to FIG. 1.

FIG. 1 is a view of the flexible device according to the first exemplary embodiment.

As shown in FIG. 1, the flexible device 100 according to the first exemplary embodiment includes a flexible substrate SUB and a sensing unit 110A.

The flexible substrate SUB is formed of a transparent insulating substrate such as glass, quartz, ceramic, and resin. However, the first exemplary embodiment is not limited thereto, and the flexible substrate SUB may be formed of a metallic substrate such as stainless steel. The flexible substrate SUB has a flexible characteristic thereby being flexible.

The sensing unit 110A measures a bending degree of the flexible substrate SUB and includes a first line 111, a second line 112, and a first controller 113.

Figure 2:
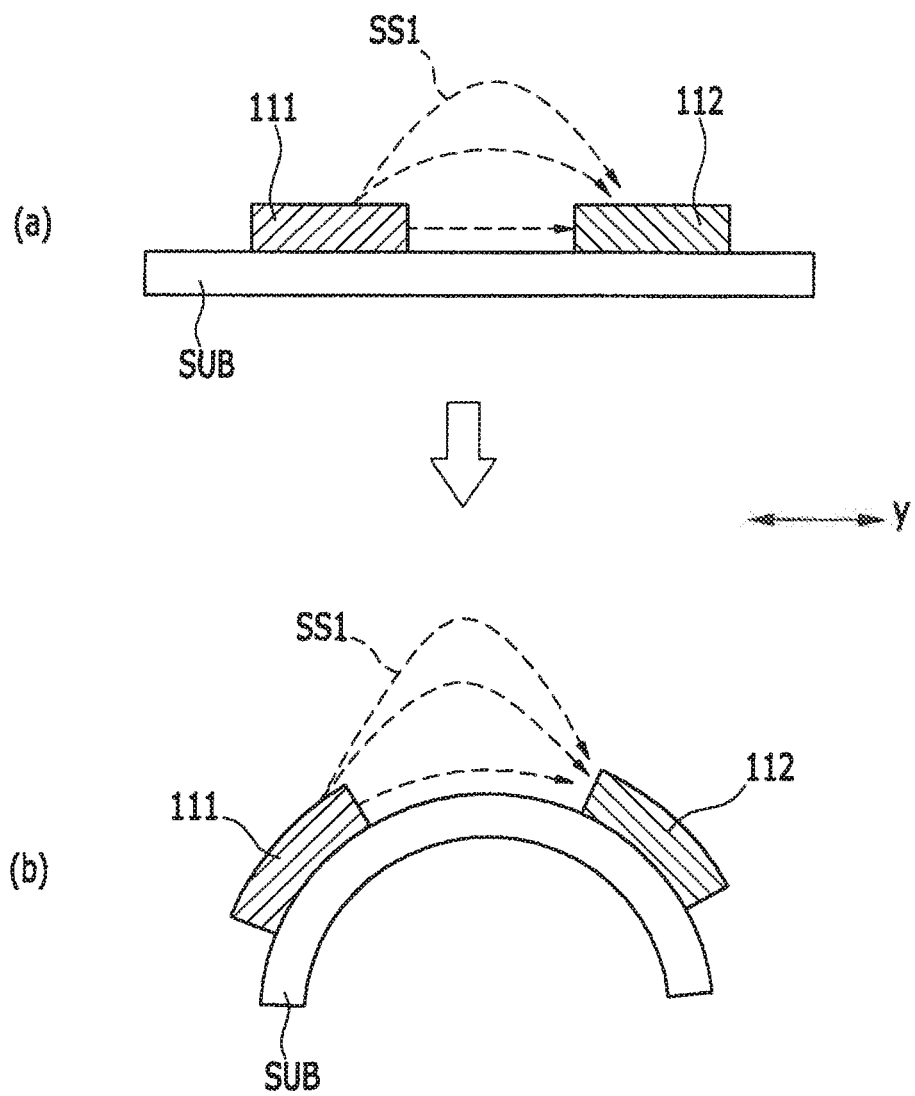
FIG. 2 is a cross-sectional view taken along the line II-II of FIG. 1.

FIG. 2 is a cross-sectional view taken along the line II-II of FIG. 1. FIG. 2 ($a$) shows a case in which the flexible substrate is flat, and FIG. 2 ($b$) shows a case in which the flexible substrate is bent.

As shown in FIG. 1 and FIG. 2, the first line 111 is positioned on the flexible substrate SUB and extends in the first direction (x). A plurality of first lines 111 are formed, and the plurality of first lines 111 are respectively disposed in a second direction (y) crossing the first direction (x). The first line 111 is made of a conductive material such as a metal, and is formed on the flexible substrate SUB through a MEMS process such as photolithography.

The second line 112 is positioned with the same layer as the first line 111 and is separated from the first line 111. That is, the second line 112 is adjacent to the first line 111, and the second line 112 and the first line 111 are adjacent to each other on the same plane. The second line 112 is positioned on the flexible substrate SUB and extends in the first direction (x) parallel to the first line 111. The plurality of second lines 112 are formed and disposed in the second direction (y). The second line 112 is made of the conductive material such as the metal and is formed on the flexible substrate SUB through the MEMS process such as photolithography. The second line 112 may be simultaneously or concurrently formed along with the first line 111 on the flexible substrate SUB through one photolithography process.

The first controller 113 is positioned at one end of the flexible substrate SUB and is connected to the first line 111 and the second line 112. The first controller 113 applies the first sensing signal SS1 to the first line 111 and measures crosstalk generated in the second line 112 by the first sensing signal SS1 according to bending of the flexible substrate SUB. For example, firstly, as shown in FIG. 2 ($a$), in the state that the flexible substrate SUB is flat, the first controller 113 applies the first sensing signal SS1 to the first line 111, and the first controller 113 measures the crosstalk generated in the second line 112 by the first sensing signal SS1. Next, as shown in FIG. 2 ($b$), if the flexible substrate SUB is bent in the second direction (y) while having a curved surface, as the flexible substrate SUB is bent in the second direction (y), the first line 111 and the second line 112 are further away from each other than when the flexible substrate SUB is flat such that the crosstalk generated in the second line 112 by the first sensing signal SS1 applied to the first line 111 is deteriorated, and the change of the crosstalk is measured by the first controller 113 to measure the bending degree of the flexible substrate SUB.

Here, the first sensing signal SS1 may be a current or a voltage, the first controller 113 measures the change of the current or the voltage flowing to the second line 112 by the crosstalk generated by the first sensing signal SS1 applied to the first line 111 to measure a bending degree of the flexible substrate SUB.

As described above, the flexible device 100 according to the first exemplary embodiment includes the sensing unit 110A including the first line 111, the second line 112, and the first controller 113 to measure the change of the crosstalk of the second line 112, thereby measuring the bending degree of the flexible substrate SUB.

Accordingly, a graphics user interface (GUI) driven by the flexible device 100 may be changed according to the bending degree of the flexible substrate SUB.

That is, by including the sensing unit 110A, through efficiency of measuring the bending degree of the flexible substrate SUB, the flexible device 100 may be intuitively driven according to the bending degree of the flexible substrate SUB such that the flexible device 100 is driven by the bending of the flexible substrate SUB.

Also, the flexible device 100 according to the first exemplary embodiment includes a plurality of first lines 111 and second lines 112, and the plurality of first lines 111 and second lines 112 are disposed according to the second direction (y) such that the first controller 113 may sense whether any portion is bent for the entire flexible substrate SUB. Accordingly, by bending any region of the entire flexible substrate SUB, this regional bending can be detected, and the flexible device 100 that can be differently driven according to each region is provided.

Next, referring to FIG. 3 and FIG. 4, a flexible device according to a second exemplary embodiment will be described.

Hereinafter, only the characteristic parts different from the first embodiment will be described, and parts which are not described will follow the first embodiment. In the second embodiment, the same reference numerals as those of the first embodiment will be used for the same elements.

Figure 3:
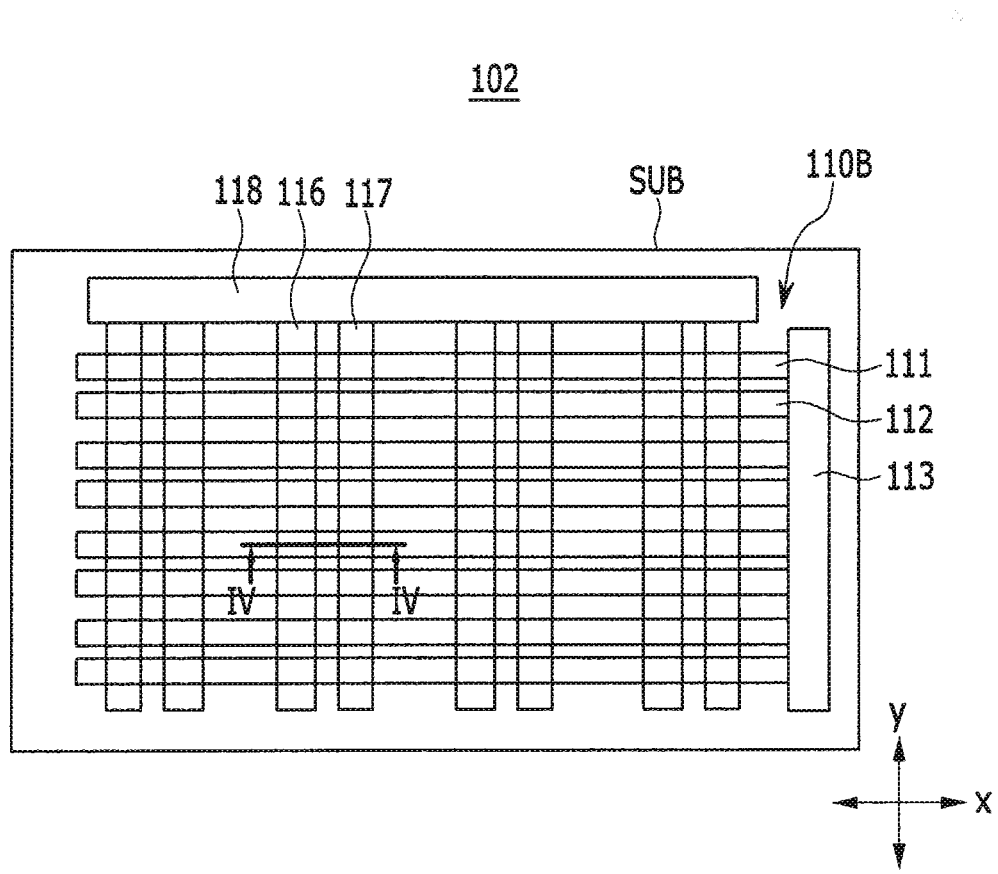
FIG. 3 is a view of a flexible device according to a second exemplary embodiment.

FIG. 3 is a view of a flexible device according to the second exemplary embodiment. FIG. 4 is a cross-sectional view taken along the line IV-IV of FIG. 3. FIG. 4 (a) shows a case in which the flexible substrate is flat, and FIG. 4 (b) shows a case in which the flexible substrate is bent.

Figure 4:
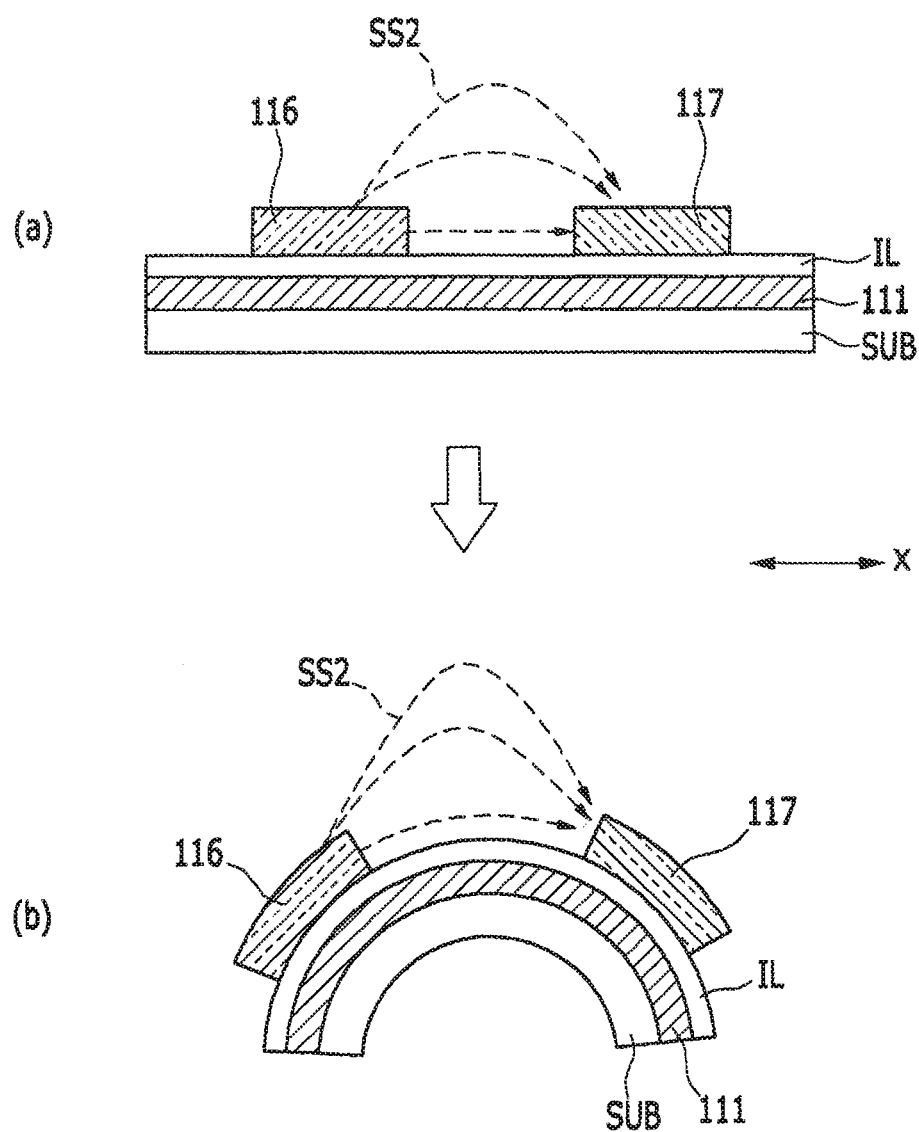
FIG. 4 is a cross-sectional view taken along the line IV-IV of FIG. 3.

As shown in FIG. 3 and FIG. 4, the flexible device 102 according to the second exemplary embodiment includes a flexible substrate SUB and a sensing unit 110B.

The sensing unit 110B measures the bending degree of the flexible substrate SUB, and includes the first line 111, the second line 112, the first controller 113, the third line 116, the fourth line 117, and the second controller 118.

The third line 116 is positioned on the flexible substrate SUB and extends in the second direction (y) crossing the first direction (x). A plurality of third lines 116 are formed and respectively disposed in the first direction (x). The third line 116 is made of the conductive material such as the metal and is formed on the flexible substrate SUB through the MEMS process such as photolithography. The third line 116 is positioned on the first line 111 and the second line 112 via the insulation layer IL interposed therebetween.

The fourth line 117 is positioned with the same layer as the third line 116 and is separated from the third line 116. That is, the fourth line 117 is adjacent to the third line 116, and the fourth line 117 and the third line 116 are adjacent to each other on the same plane. The third line 116 is positioned on the flexible substrate SUB and extends in the second direction (y) parallel to the third line 116. A plurality of fourth lines 117 are formed and disposed in the first direction (x). The fourth line 117 is made of the conductive material such as the metal, and is formed on the flexible substrate SUB through the MEMS process such as photolithography. The fourth line 117 may be simultaneously or concurrently formed along with the third line 116 on the flexible substrate SUB. Like the third line 116, the fourth line 117 is positioned on the first line 111 and the second line 112 via the insulation layer (IL) interposed therebetween.

The second controller 118 is positioned at the other end of the flexible substrate SUB, and is respectively connected to the third line 116 and the fourth line 117. The second controller 118 applies the second sensing signal SS2 to the third line 116, and measures the change of crosstalk generated in the fourth line 117 by the second sensing signal SS2 according to the bending of the flexible substrate SUB. For example, firstly, as shown in FIG. 4 (a), in the state that the flexible substrate SUB is flat, the second controller 118 applies the second sensing signal SS2 to the third line 116, and the second controller 118 measures the crosstalk generated in the fourth line 117 by the second sensing signal SS2. Next, as shown in FIG. 4 (b), if the flexible substrate SUB is bent in the first direction (x) while having the curved surface, as the flexible substrate SUB is bent in the first direction (x), the third line 116 the fourth line 117 are further away from each other than when the flexible substrate SUB is flat such that the crosstalk generated in the fourth line 117 by the second sensing signal SS2 applied to the third line 116 is deteriorated, and the change of the crosstalk is measured by the second controller 118 to measure the bending degree of the flexible substrate SUB.

Here, the second sensing signal SS2 may be a current or a voltage, and the second controller 118 measures the change of the current or the voltage flowing to the fourth line 117 by the crosstalk generated by the second sensing signal SS2 applied to the third line 116 to measure the bending degree of the flexible substrate SUB.

As described above, the flexible device 102 according to the second exemplary embodiment includes the sensing unit 110 having the first line 111, the second line 112, the first controller 113, the third line 116, the fourth line 117, and the second controller 118 to measure the change of the crosstalk respectively generated in the second line 112 and the fourth line 117, thereby measuring the bending degree of the flexible substrate SUB in the first direction (x) and the second direction (y).

That is, by including the sensing unit 110B that efficiently measures the bending degree of the flexible substrate SUB, the flexible device 102 may be intuitively driven according to the bending degree of the flexible substrate SUB such that the flexible device 102 driven by the bending of the flexible substrate SUB is provided.

Also, the flexible device 102 according to the second exemplary embodiment includes the plurality of the first lines 111, the second lines 112, the third lines 116, and the fourth lines 117, and a plurality of the first lines 111 and the second lines 112 are respectively disposed according to the second direction (y) and the plurality of the third lines 116 and the fourth lines 117 are respectively disposed according to the first direction (x) such that the first controller 113 and the second controller 118 may sense whether any portion is bent for the entire flexible substrate SUB. Accordingly, by bending any region of the entire flexible substrate SUB, this regional bending can be detected, and the flexible device 102 that can be differently driven according to each region is provided.

Next, referring to FIG. 5 to FIG. 7, a flexible device according to a second exemplary embodiment will be described.

Hereinafter, only the characteristic parts different from the first embodiment will be described, and parts which are not described will follow the first embodiment. In the third embodiment, the same reference numerals as those of the first embodiment will be used for the same elements.

Figure 5:
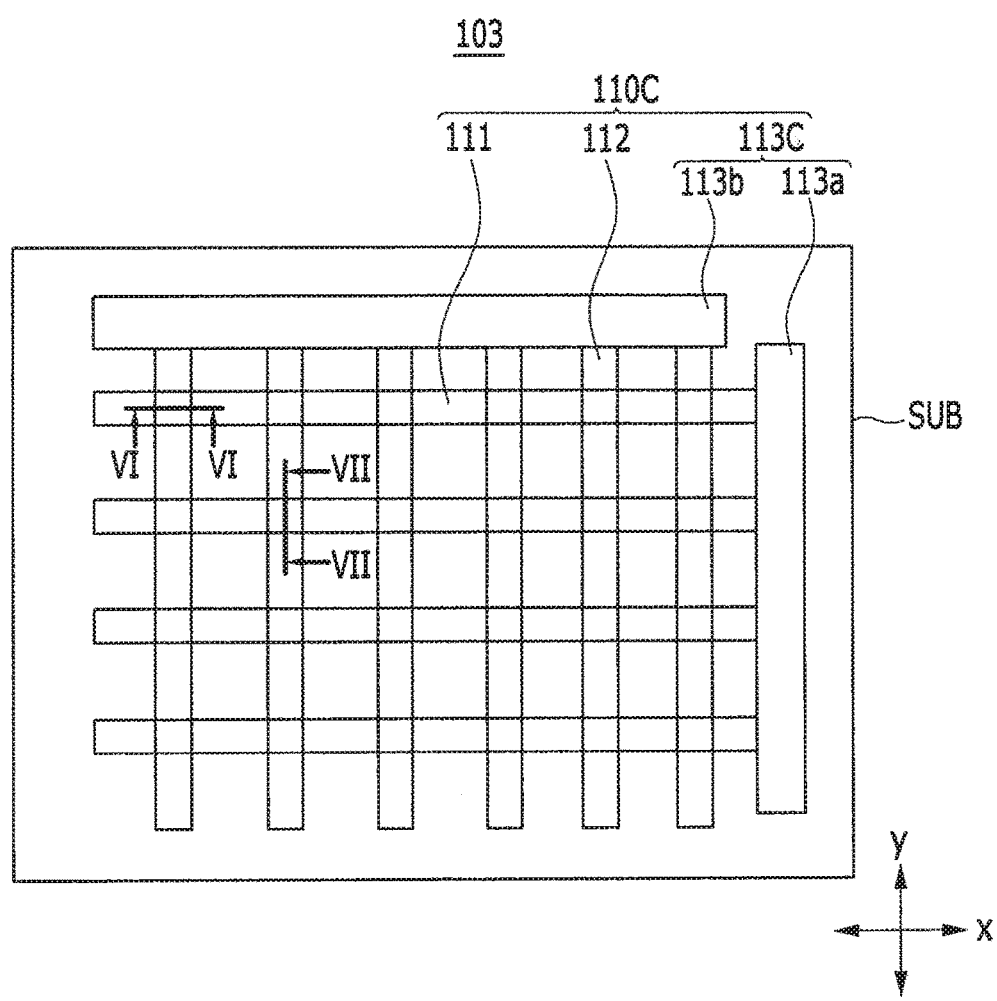
FIG. 5 is a view of a flexible device according to a third exemplary embodiment.

FIG. 5 is a view of the flexible device according to the third exemplary embodiment.

As shown in FIG. 5, the flexible device 103 according to the third exemplary embodiment includes a flexible substrate SUB and a sensing unit 110C.

The sensing unit 110C measures the bending degree of the flexible substrate SUB, and includes a first line 111, a second line 112, and a first controller 113C.

Figure 6:
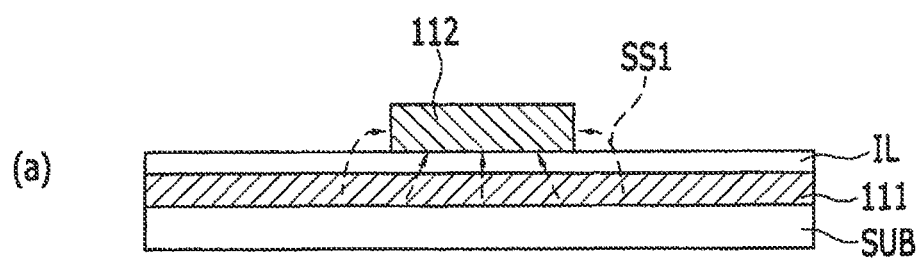
FIG. 6 is a cross-sectional view taken along the line VI-VI of FIG. 5.
Figure 6:
Figure 6:
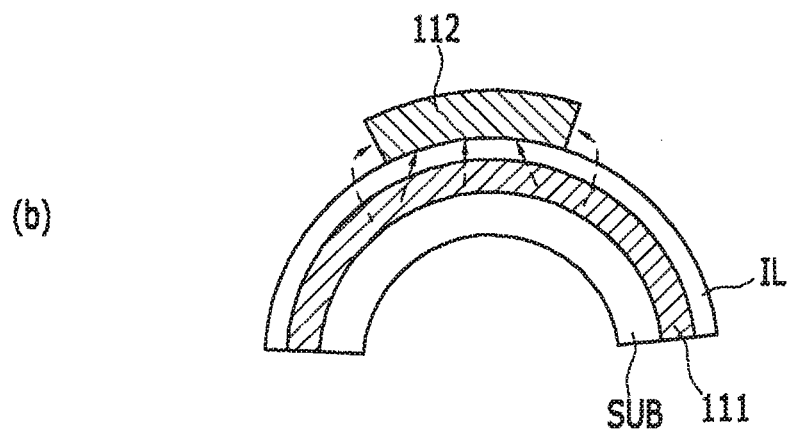

FIG. 6 is a cross-sectional view taken along the line VI-VI of FIG. 5. FIG. 6 (a) shows a case in which the flexible substrate is flat, and FIG. 6 (b) shows a case in which the flexible substrate is bent.

As shown in FIG. 5 and FIG. 6, the first line 111 is positioned on the flexible substrate SUB and extends in the first direction (x). A plurality of first lines 111 are formed, and the plurality of the first lines 111 are respectively disposed in the second direction (y) crossing the first direction (x). Each first line 111 is made of a conductive material such as a metal and is formed on the flexible substrate SUB through a MEMS process such as photolithography.

Figure 7:
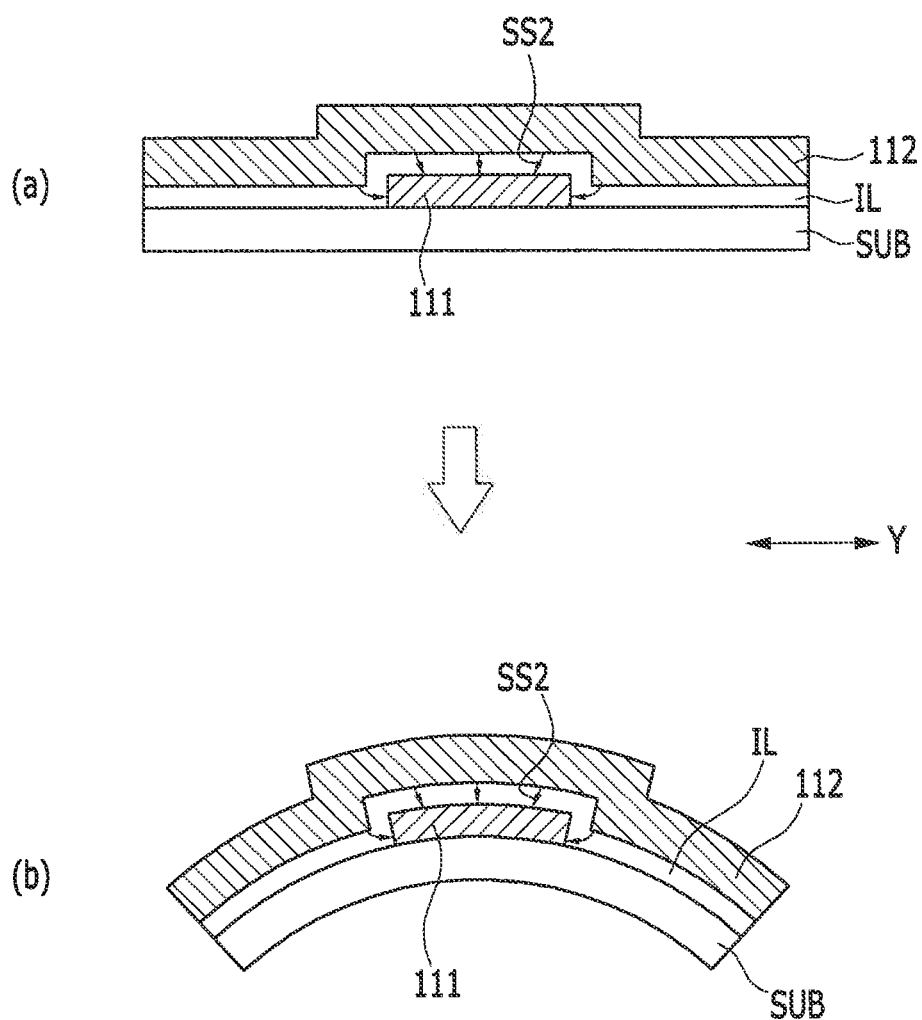
FIG. 7 is a cross-sectional view taken along the line VII-VII of FIG. 5.

FIG. 7 is a cross-sectional view taken along the line VII-VII of FIG. 7. FIG. 7 (a) shows a case in which the flexible substrate is flat, and FIG. 7 (b) shows a case in which the flexible substrate is bent.

As shown in FIG. 5 and FIG. 7, the second line 112 is positioned (formed) with a different layer from the first line 111 and is separated from the first line 111 via the insulation layer (IL) interposed therebetween. That is, the second line 112 is adjacent to the first line 111, and the second line 112 and the first line 111 are adjacent to each other on different layers. The second line 112 is positioned on the flexible substrate SUB and extends in the second direction (y) crossing the first direction (x) as the elongation direction of the first line 111. That is, the second line 112 intersects the first line 111. A plurality of the second lines 112 are formed and, the plurality of the second lines 112 are respectively disposed in the first direction (x). Each second line 112 is made of the conductive material such as the metal, and is formed on the flexible substrate SUB through the MEMS process such as photolithography. The second line 112 may be formed on the flexible substrate SUB through a different process from the first line 111.

The first controller 113C includes a first sub-controller 113a and a second sub-controller 113b.

The first sub-controller 113a is positioned at one side end of the flexible substrate SUB and is connected to the first line 111. The second sub-controller 113b is positioned at another side end of the flexible substrate SUB and is separated from the first sub-controller 113a and is connected to the second line 112.

The first sub-controller 113a applies the first sensing signal SS1 to the first line 111 and then measures the change of the crosstalk generated in the first line 111 by the second sensing signal SS2 according to the bending of the flexible substrate SUB.

The second sub-controller 113b applies the second sensing signal SS2 to the second line 112, and then measures the change of the crosstalk generated in the second line 112 by the first sensing signal SS1 according to the bending of the flexible substrate SUB.

For example, firstly, as shown in FIG. 6 (a), in the state in which the flexible substrate SUB is flat, the first sub-controller 113a applies the first sensing signal SS1 to the first line 111, and the second sub-controller 113b measures the crosstalk generated in the second line 112 by the first sensing signal SS1. Next, as shown in FIG. 6 (b), if the flexible substrate SUB is bent in the second direction (y) while having the bent surface, the flexible substrate SUB is bent in the second direction (y) such that the area of the entire first line 111 affecting the crosstalk to the second line 112 is decreased, and thereby the crosstalk generated in the second line 112 by the first sensing signal SS1 applied to the first line 111 is deteriorated and the change of the crosstalk is measured by the second sub-controller 113b and the bending degree of the flexible substrate SUB is measured. At this time, the crosstalk generated in the second line 112 may be changed by the capacitance formed at the insulation layer (IL) between the first line 111 and the second line 112.

Here, the first sensing signal SS1 may be a current or a voltage, and the second sub-controller 113b measures the change of the current or the voltage flowing to the second line 112 by the crosstalk generated by the first sensing signal SS1 applied to the first line 111 to measure the bending degree of the flexible substrate SUB.

As another example, as shown in FIG. 7 (a), in the state that the flexible substrate SUB is flat, the second sub-controller 113b applies the second sensing signal SS2 to the second line 112, and the crosstalk generated in the first line 111 by the second sensing signal SS2 is measured by the first sub-controller 113a. Next, as shown in FIG. 7 (b), if the flexible substrate SUB is bent in the first direction (x) while having the bent surface, the flexible substrate SUB is bent in the first direction (x) such that the area of the entire second line 112 affecting the crosstalk to the first line 111 is increased, and thereby the crosstalk generated in the first line 111 by the second sensing signal SS2 applied to the second line 112 is increased and the change of the crosstalk is measured by the first sub-controller 113a and the bending degree of the flexible substrate SUB is measured. At this time, the crosstalk generated in the first line 111 may be changed by the capacitance formed at the insulation layer (IL) between the first line 111 and the second line 112.

Here, the second sensing signal SS2 may be a current or a voltage, and the first sub-controller 113a measures the change of the current or the voltage flowing to the first line 111 by the crosstalk generated by the second sensing signal SS2 applied to the second line 112 to measure the bending degree of the flexible substrate SUB.

As described above, the flexible device 103 according to the third exemplary embodiment includes the sensing unit 110C including the first line 111, the second line 112, and the first controller 113C to measure the change of the crosstalk generated in the first line 111 and the second line 112 thereby measuring the bending degree of the flexible substrate SUB.

That is, by including the sensing unit 110C that efficiently measures the bending degree of the flexible substrate SUB, the flexible device 100 may be intuitively driven according to the bending degree of the flexible substrate SUB such that the flexible device 103 driven by the bending of the flexible substrate SUB is provided.

Also, the flexible device 103 according to the third exemplary embodiment includes a plurality of first lines 111 and second lines 112, and the plurality of first lines 111 and second lines 112 are disposed according to the second direction (y) and the first direction (x) such that the first controller 113 may sense whether any portion is bent for the entire flexible substrate SUB. Accordingly, by bending any region of the entire flexible substrate SUB, this regional bending can be detected, and the flexible device 103 that can be differently driven according to each region is provided.

Next, a display device according to a fourth exemplary embodiment will be described with reference to FIG. 8 to FIG. 10.

Hereinafter, only the characteristic parts discriminated from the second embodiment will be described, and parts which are not described will follow the second embodiment.

In addition, in the accompanying drawings, an organic light emitting diode (OLED) display is illustrated as an active matrix (AM)-type OLED display in a 2Tr-1Cap structure in which two thin film transistors (TFTs) and one capacitor are formed in one pixel, but the present invention is not limited thereto. Therefore, the OLED display can have various structures. For example, three or more TFTs and two or more capacitors can be provided in one pixel of the OLED display, and separate wires can be further provided in the OLED display. Here, the pixel refers to a minimum unit for displaying an image, and the OLED display displays an image by using a plurality of pixels.

Also, a gate driver may be referred to as a first pixel driver, and a data driver may be referred to as a second pixel driver.

Figure 8:
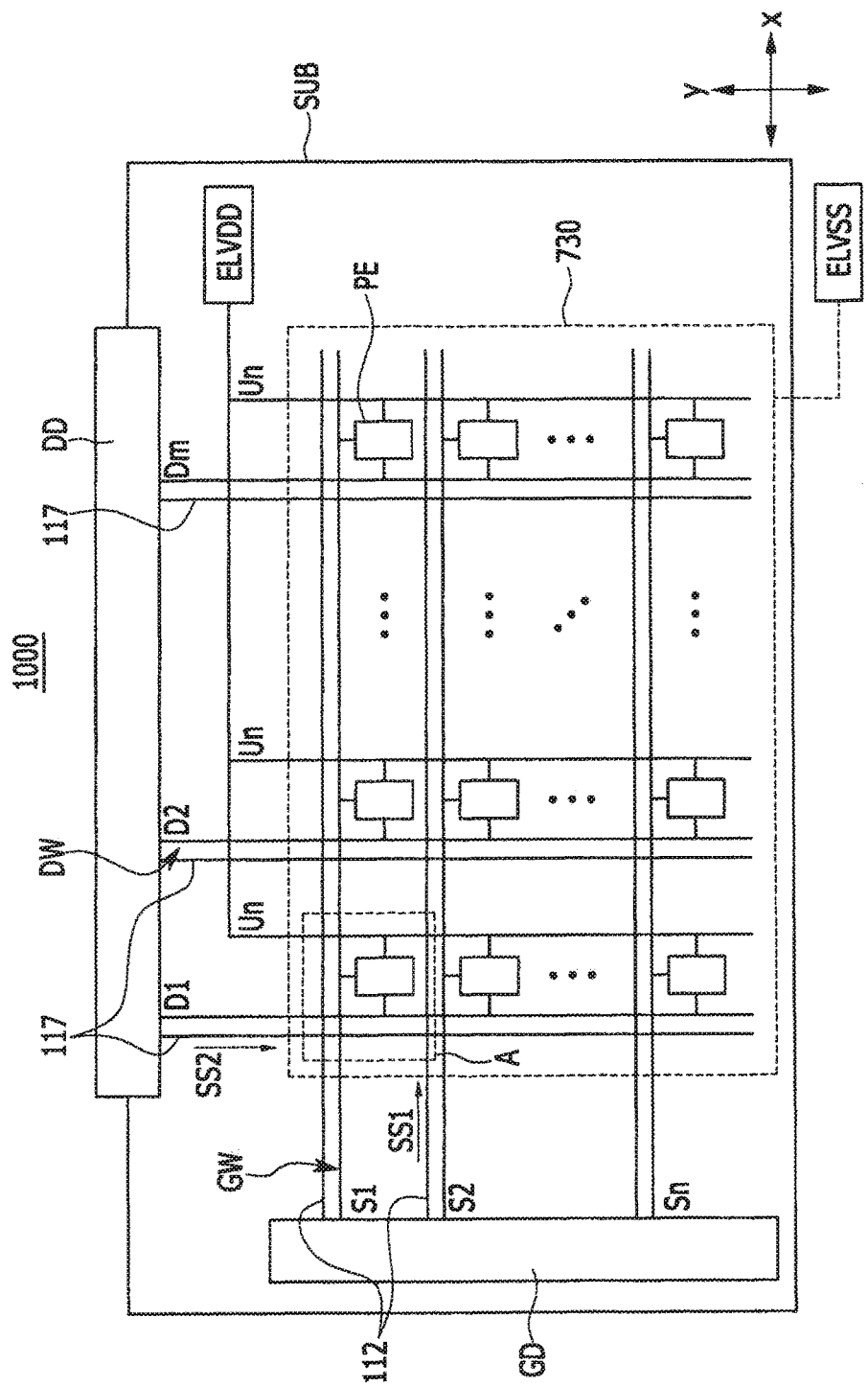
FIG. 8 is a view of a display device according to a fourth exemplary embodiment.

FIG. 8 is a view of the display device according to the fourth exemplary embodiment.

As shown in FIG. 8, the display device 1000 according to the fourth exemplary embodiment includes a flexible substrate SUB, a gate driver GD, gate wires GW, a data driver DD, a data wires DW, a pixel PE, a second line 112, and a fourth line 117. Here, the pixel PE refers to a minimum unit for displaying an image, and the display device 1000 displays an image by using a plurality of pixels PE.

The gate driver GD sequentially supplies scan signals to the gate wires GW in accordance with a control signal supplied from an external control circuit, for example, a control signal supplied from a timing controller. Then, the pixels PE are selected by the gate signal and sequentially receive data signals.

The gate wires GW are disposed on the flexible substrate SUB via the first insulation layer 140 (shown in FIG. 10) and extended in the first direction (x). The gate wires GW include first lines S1-Sn, and the first line Sn is connected to the gate driver GD thereby receiving a gate signal from the gate driver GD.

Meanwhile, in the display device 1000 according to the fourth exemplary embodiment, the gate wires GW includes the first line Sn, and in a display device according to another exemplary embodiment, the gate wires may further include an additional gate line, an initial power source line, and a light emission control line. In this case, the display device may be an active matrix (AM) type of organic light emitting diode (OLED) display of a 6Tr-2Cap structure.

The data driver DD supplies a data signal to the third line Dm among the data wires DW corresponding to the control signal supplied from the external source such as a timing controller. The data signal supplied to the third line Dm is supplied to a pixel PE selected by a gate signal when the gate signal is supplied to the first line Sn. Then, the pixel PE changes a voltage corresponding to the data signal and emits light with luminance corresponding thereto.

The data wires DW are positioned on the gate wires GW via the second insulation layer 170 (shown in FIG. 10) that will be described later and are extended in the second direction (y) crossing the first direction (x). The data wires DW include the third lines D1-Dm and a driving power line Un. The third line Dm is connected to the data driver DD and receives a data signal from the data driver DD. The driving power line Un is connected with an external first power source ELVDD, and receives driving power from the first power source ELVDD.

The pixel PE is positioned at a region where the gate wires GW and the data wires DW are crossed and is connected to the gate wires GW and the data wires DW. The pixel PE includes the first power source ELVDD, a thin film transistor, and a capacitor connected to the gate wires GW and the data wires DW, and an organic light emitting element connected between the thin film transistor and the second power source ELVSS. The pixel (PE) is selected to charge a voltage corresponding to a data signal when a gate signal is provided through the first line Sn, and it emits light with a set or predetermined luminance in accordance with the charged voltage. A more detailed arrangement of the pixel PE will be described later.

Next, referring to FIG. 9, the arrangement of the pixel PE will be described in more detail.

Figure 9:
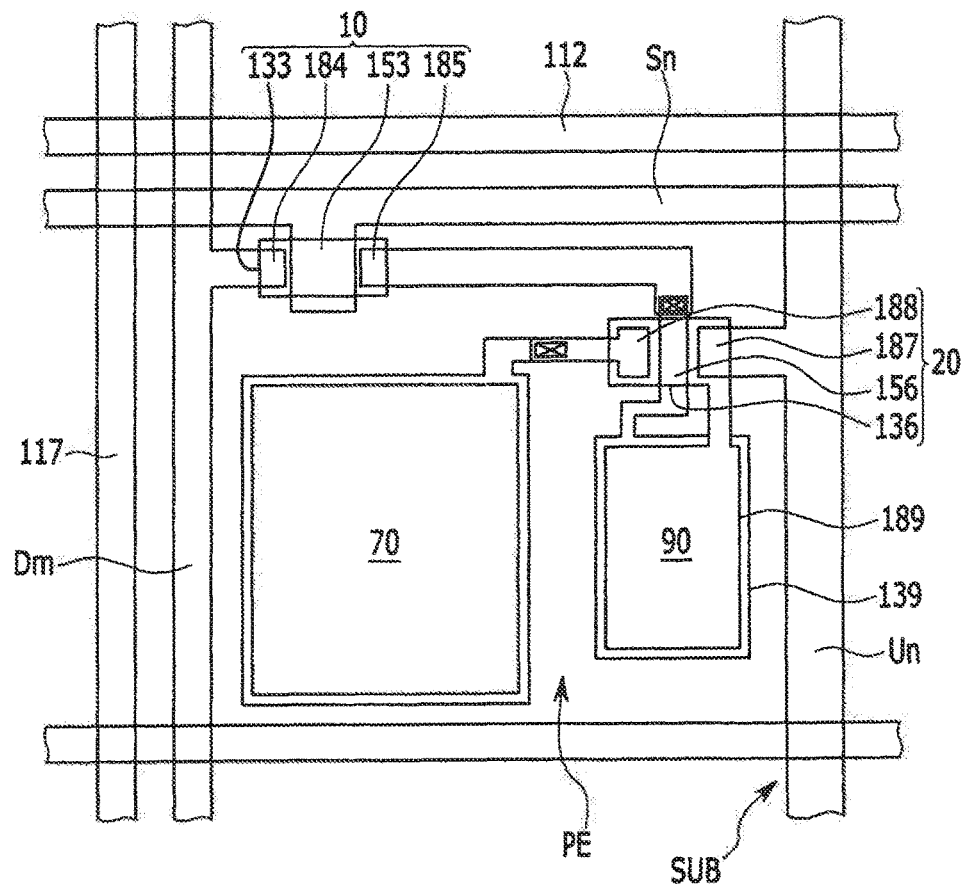
FIG. 9 is a layout view of the portion A of FIG. 8.

FIG. 9 is a layout view of the portion A of FIG. 8.

As shown in FIG. 9, one pixel PE has a 2Tr-1Cap structure in which an organic light emitting diode 70, two thin film transistors (TFTs) 10 and 20, and a capacitor 90 are disposed. However, in another exemplary embodiment, one pixel can have a configuration in which at least three thin film transistors and at least two capacitors are disposed.

The organic light emitting diode 70 includes a first electrode that is an anode functioning as a hole injection electrode, a second electrode that is a cathode functioning as an electron injection electrode, and an organic emission layer disposed between the first electrode and the second electrode.

In more detail, in the fourth exemplary embodiment, the display device includes the first thin film transistor 10 and the second thin film transistor 20 for each pixel PE. The first thin film transistor 10 and the second thin film transistor 20 include gate electrodes 153 and 156, active layers 133 and 136, source electrodes 184 and 187, and drain electrodes 185 and 188.

The source electrode 184 of the first thin film transistor 10 is connected to the third line Dm, and the gate electrode 153 of the first thin film transistor 10 is connected to the first line Sn. A node is formed between the drain electrode 185 of the first thin film transistor 10 and the capacitor 90 so the drain electrode 185 of the first thin film transistor 10 is connected to a first capacitor electrode 139 of the capacitor 90. Also, the drain electrode 185 of the first thin film transistor 10 is connected to the gate electrode 156 of the second thin film transistor 20. The drive power line (Un) is connected to the source electrode 187 of the second thin film transistor 20, and the first electrode that is the anode of the organic light emitting diode 70 is connected to the drain electrode 188.

The first thin film transistor 10 is used as a switch for selecting the pixel PE to emit light. When the first thin film transistor 10 is turned on, the capacitor 90 is charged, and the amount of the charge is in proportion to the voltage applied from the third line Dm. While the first thin film transistor 10 is turned off, a gate potential (voltage) of the second thin film transistor 20 rises according to the potential charged in the capacitor 90. The second thin film transistor 20 is turned on when the gate potential exceeds a threshold voltage. The voltage applied to the drive power line (Un) is applied to the organic light emitting diode 70 through the second thin film transistor 20, and the organic light emitting diode 70 emits light.

The configuration of the above-described pixel (PE) is not restricted to the description, and is variable in many ways with a range of easy modifications by a person skilled in the art.

A configuration of the thin film transistors 10 and 20, the organic light emitting diode 70, and the capacitor 90 included in the pixel (PE) of the display device 1000 according to the fourth exemplary embodiment will now be described in more detail according to a stacked order with reference to FIG. 10.

Figure 10:
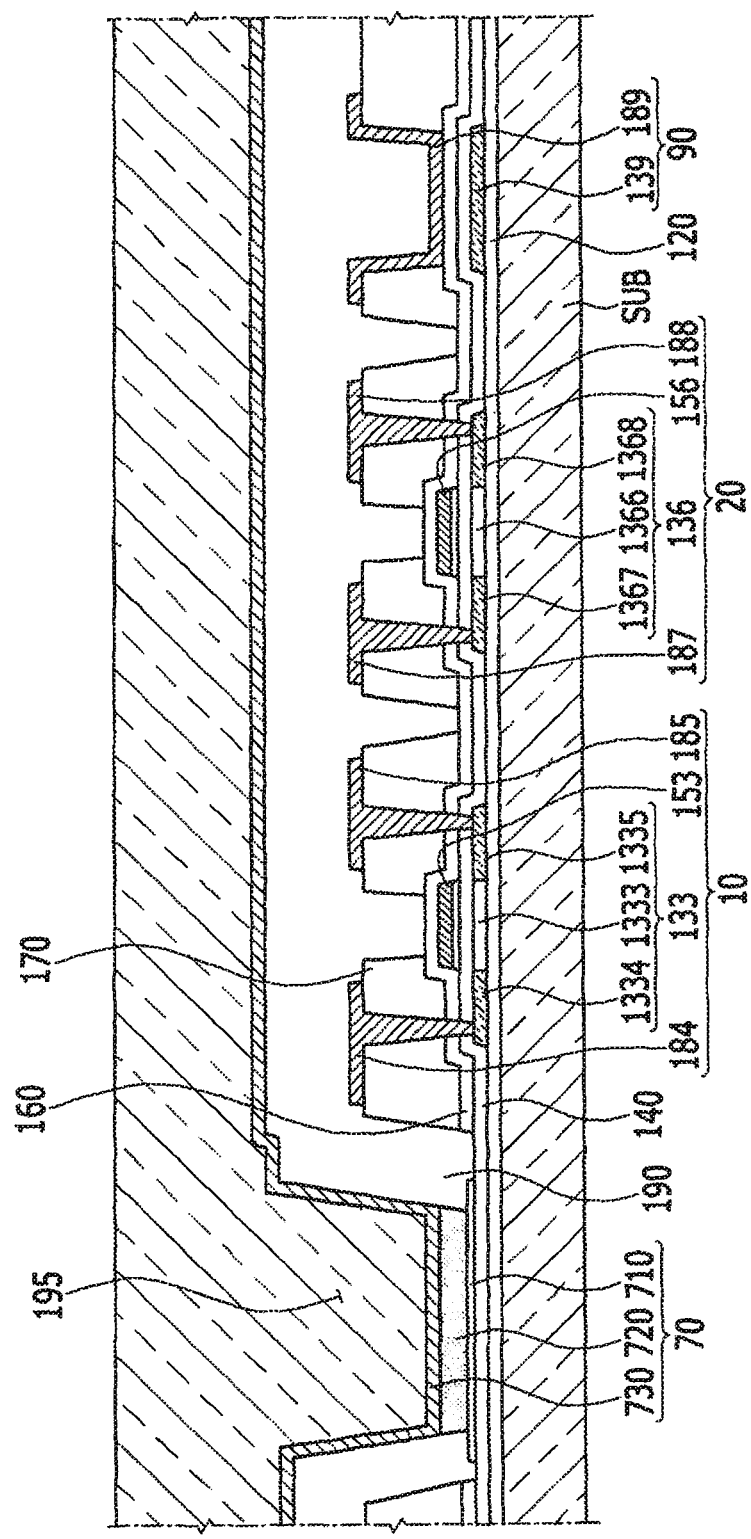
FIG. 10 is a cross-sectional view focusing a thin film transistor, a capacitor, and an organic light emitting element shown in FIG. 9.

FIG. 10 shows a cross-sectional view of a thin film transistor, a capacitor, and an organic light emitting diode shown in FIG. 9.

As shown in FIG. 10, a buffer layer 120 is formed on the substrate SUB. The buffer layer 120 is formed with a single layer or multiple layers including at least one insulating layer such as a silicon oxide layer and a silicon nitride layer by using a chemical vapor deposition method or a physical vapor deposition method.

The buffer layer 120 prevents (or protects from) diffusion or penetration of moisture or impurities into the substrate SUB, smoothes (or levels) the surface, and controls a heat transmission speed during a crystallization process for forming an active layer.

The buffer layer 120 can be omitted depending on the type of substrate SUB and process conditions.

Active layers 133 and 136 and a first capacitor electrode 139 are formed on the buffer layer 120. The active layers 133 and 136 and the first capacitor electrode 139 are formed by forming an amorphous silicon layer on the buffer layer 120, crystallizing the same, forming a polysilicon film, and patterning the polysilicon film. However, the fourth exemplary embodiment is not limited thereto. If necessary, the first capacitor electrode 139 can be formed with a material that is different from the active layers 133 and 136.

A first insulation layer 140 is formed on the active layers 133 and 136 and the first capacitor electrode 139. In more detail, the first insulation layer 140 is formed to cover the active layers 133 and 136 and the first capacitor electrode 139 on the buffer layer 120. The first insulation layer 140 is formed by including at least one of various insulating materials such as tetraethyl orthosilicate (TEOS), silicon nitride (SiNx), and silicon oxide (SiO2) that are known to a skilled person in the art.

Gate electrodes 153 and 156 and a first electrode 710 are formed on the same layer as the first lines S1 to Sn (used as the gate wires GW), and they are formed with the same material on the first insulation layer 140. The gate electrodes 153 and 156 are formed on the active layers 133 and 136 so that they may be overlapped on channel regions 1333 and 1366 of the active layers 133 and 136. The active layers 133 and 136 include the channel regions 1333 and 1366 to which no impurity is doped, and source regions 1334 and 1367 and drain regions 1335 and 1368 that are disposed on respective sides of the channel regions 1333 and 1366 and to which an impurity is doped. The gate electrodes 153 and 156 can prevent (or protect from) the impurity from being doped to the channel regions 1333 and 1366 while the impurity is doped to form the source regions 1334 and 1367 and the drain regions 1335 and 1368. Also, the impurity can be doped to the first capacitor electrode 139 while the impurity is doped to the source regions 1334 and 1367 and the drain regions 1335 and 1368 of the active layers 133 and 136.

Further, the gate electrodes 153 and 156 are formed with double layers including a gate transparent layer and a gate metal layer that is formed on the gate transparent layer. The gate metal layer is formed to include at least one of various metallic materials that are known to a person skilled in the art such as molybdenum (Mo), chromium (Cr), aluminum (Al), silver (Ag), titanium (Ti), tantalum (Ta), or tungsten (W). The gate transparent layer includes at least one of transparent conductive layers such as indium tin oxide (ITO), indium zinc oxide (IZO), zinc indium tin oxide (ZITO), gallium indium tin oxide (GITO), indium oxide ($In_2O_3$), zinc oxide (ZnO), gallium indium zinc oxide (GIZO), gallium zinc oxide (GZO), fluorine tin oxide (FTO), or aluminum-doped zinc oxide (AZO).

The first electrode 710 is formed on a same layer with the same material as the gate transparent layers of the gate electrodes 153 and 156.

An inorganic insulation layer 160 is formed on the gate electrodes 153 and 156. The inorganic insulation layer 160 includes at least one of a silicon oxide layer and a silicon nitride layer. That is, the inorganic insulation layer 160 can be formed with a single layer made of silicon oxide or silicon nitride, or multiple layers stacked with the silicon oxide layer and the silicon nitride layer. Also, the inorganic insulation layer 160 can include hydrogen. Particularly, the silicon nitride layer can readily include hydrogen according to the process conditions. The inorganic insulation layer 160 can support an annealing process by supplying hydrogen to the active layers 133 and 136 while the active layers 133 and 136 undergo the annealing process, in addition to the insulation function.

However, the first exemplary embodiment is not limited thereto. Therefore, the inorganic insulation layer 160 can be omitted. That is, the second insulation layer 170 to be described can be formed on the gate electrodes 153 and 156.

Also, the inorganic insulation layer 160 is not formed on the first electrode 710. That is, the inorganic insulation layer 160 is formed to expose the first electrode 710.

A second insulation layer 170 is formed on the inorganic insulation layer 160. The second insulation layer 170 can be readily formed to be relatively thicker than the inorganic insulation layer 160. Therefore, the second insulation layer 170 can be formed to be thick enough to acquire stable interlayer insulation. For example, the second insulation layer 170 can be formed to be substantially 3 µm (micrometers) thick.

The second insulation layer 170 is thicker than the first insulation layer 140 so the first insulation layer 140 is thinner than the second insulation layer 170.

Further, the second insulation layer 170 is not formed on the first electrode 710 in a like manner of the inorganic insulation layer 160. That is, the second insulation layer 170 is also formed to reveal the first electrode 710.

A plurality of conductive wires 184, 185, 187, 188, and 189 are formed on a same layer as the data lines D1 to Dm (used as the data wires DW), and they are formed with the same material on the second insulation layer 170. The conductive wires include source electrodes 184 and 187, drain electrodes 185 and 188, and a second capacitor electrode 189. The conductive wires can further include the third line Dm and the drive power line Un.

Further, the conductive wires (electrodes) 184, 185, 187, 188, and 189 can be formed by including at least one of various metallic materials that are known to a person skilled in the art in a like manner of the gate electrodes 153 and 156.

The source electrodes 184 and 187 and the drain electrodes 185 and 188 contact the source regions 1334 and 1367 and the drain regions 1335 and 1368 of the active layers 133 and 136 through contact holes that are formed in the inorganic insulation layer 160 and the second insulation layer 170.

Also, the second capacitor electrode 189 is formed at the same position as the source electrodes 184 and 187 and the drain electrodes 185 and 188, and the fourth exemplary embodiment is not limited thereto. Therefore, the second capacitor electrode 189 can be formed on the same layer as the gate electrodes 153 and 156.

A pixel defining layer 190 is formed on the conductive wires 184, 185, 187, 188, and 189. That is, the pixel defining layer 190 is provided on the third lines D1 to Dm. The pixel defining layer 190 includes a pixel opening 195 for revealing a part of the first electrode 710. The pixel defining layer 190 can be formed with various organic materials that are known to a person skilled in the art. For example, the pixel defining layer 190 is patterned to be a photosensitive organic layer, and is formed after being cured by heat or light.

An organic emission layer 720 is formed on the first electrode 710, and a second electrode 730 is formed on the organic emission layer 720. The first electrode 710, the organic emission layer 720, and the second electrode 730 form an organic light emitting diode 70. The pixel opening 195 of the pixel defining layer 190 in which the first electrode 710, the organic emission layer 720, and the second electrode 730 are sequentially stacked becomes a light emitting region of the organic light emitting diode 70.

Again, referring to FIG. 8 and FIG. 9, the second line 112 is positioned with the same layer as the first line Sn and is separated from the first line Sn. That is, the second line 112 is adjacent to the first line Sn, and the second line 112 and the first line Sn are close to each other on the same plane. The second line 112 is positioned on the flexible substrate SUB and extends in the first direction (x) parallel to the first line Sn. That is, the second line 112 is positioned with the same layer as the gate wires GW. A plurality of the second lines 112 are formed and respectively disposed in the second direction (y). The second lines 112 are made of the conductive material such as the metal and are formed on the flexible substrate SUB through the MEMS process such as photolithography. The second line 112 may be simultaneously or currently formed along with the first line Sn on the flexible substrate SUB through one photolithography process.

The gate driver GD is respectively connected to the first line Sn and the second line 112. The gate driver GD selectively applies the first sensing signal SS1 to the first line Sn and measures the change of crosstalk generated in the second line 112 by the first sensing signal SS1 according to the bending of the flexible substrate SUB. For example, in the state that the flexible substrate SUB is flat, the gate driver GD selectively applies the first sensing signal SS1 to the first line Sn and the gate driver GD measures the crosstalk generated in the second line 112 by the first sensing signal SS1. Next, if the flexible substrate SUB is bent in the second direction (y) while having the curved surface, the first line Sn and the second line 112 are farther away from each other according to the bending of the flexible substrate SUB in the second direction (y) than when the flexible substrate SUB is flat such that the crosstalk generated in the second line 112 by the first sensing signal SS1 applied to the first line Sn is deteriorated and the gate driver GD measures the change of the crosstalk to measure the bending degree of the flexible substrate SUB.

Here, the first sensing signal SS1 may be the current or the voltage, and the gate driver GD measures the change of the current or the voltage flowing to the second line 112 by the crosstalk generated by the first sensing signal SS1 that is selectively applied to the first line Sn to measure the bending degree of the flexible substrate SUB.

The fourth line 117 is positioned with the same layer as the third line Dm and is separated from the third line Dm. That is, the fourth line 117 is adjacent to the third line Dm, and the fourth line 117 and the third line Dm are close to each other on the same plane. The fourth line 117 is positioned on the flexible substrate SUB and extends in the second direction (y) parallel to the third line Dm. That is, the fourth line 117 is positioned with the same layer as the data wires DW. A plurality of fourth lines 117 are respectively disposed in the first direction (x). Each fourth line 117 is made of the conductive material such as the metal and is formed on the flexible substrate SUB through the MEMS process such as photolithography. The fourth line 117 may be simultaneously or concurrently formed with the data wires DW including the third line Dm on the flexible substrate SUB through one photolithography process. Like the third line Dm, the fourth line 117 is positioned on the first line Sn and the second line 112.

The data driver DD is positioned at the other end of the flexible substrate SUB and is connected to the third line Dm and the fourth line 117. The data driver DD selectively applies the second sensing signal SS2 to the third line Dm and measures the change of the crosstalk generated in the fourth line 117 by the second sensing signal SS2 according to the bending of the flexible substrate SUB. For example, firstly, in the state that the flexible substrate SUB is flat, the data driver DD selectively applies the second sensing signal SS2 to the third line Dm and the data driver DD measures the crosstalk generated in the fourth line 117 by the second sensing signal SS2. Next, if the flexible substrate SUB is bent in the first direction (x) having the curved surface, the third line Dm and the fourth line 117 are farther away from each other according to the bending of the flexible substrate SUB in the first direction (x) than when the flexible substrate SUB is flat such that the crosstalk generated in the fourth line 117 by the second sensing signal SS2 applied to the third line Dm is deteriorated such that the data driver DD can measure the change of the crosstalk to measure the bending degree of the flexible substrate SUB.

Here, the second sensing signal SS2 may be the current or the voltage, and the data driver DD measures the change of the current or the voltage flowing to the fourth line 117 by the crosstalk generated by the second sensing signal SS2 applied to the third line Dm according to the time to measure the bending degree of the flexible substrate SUB.

As described above, the display device 1000 according to the fourth exemplary embodiment includes the first line Sn, the second line 112, the gate driver GD, the third line Dm, the fourth line 117, and the data driver DD to measure the change of the crosstalk respectively generated in the second line 112 and the fourth line 117, thereby measuring the bending degree of the flexible substrate SUB in the first direction (x) and the second direction (y).

That is, the flexible display device 1000 may be intuitively driven according to the bending degree of the flexible substrate SUB such that the flexible display device 1000 driven by the bending of the flexible substrate SUB is provided.

Also, in the display device 1000 according to the fourth exemplary embodiment, the first line Sn, the second line 112, the third line Dm, and the fourth line 117 are respectively formed in plural, and the plurality of the first lines Sn and the second lines 112 are respectively disposed in the second direction (y) and the plurality of the third lines Dm and the fourth lines 117 are respectively disposed in the first direction (x), thereby the gate driver GD and the data driver DD may respectively sense whether any portion is bent for the entire flexible substrate SUB. Accordingly, by bending any region of the entire flexible substrate SUB, this regional bending can be detected, and the flexible device 100 that can be differently driven according to each region is provided.

Next, a display device according to a fifth exemplary embodiment will be described with reference to FIG. 11.

Hereinafter, only the characteristic parts discriminated from the fourth embodiment will be described, and parts which are not described will follow the fourth embodiment.

Also, a gate driver is referred to as a first sub-pixel driver, and a data driver is referred to as a second sub-pixel driver.

Figure 11:
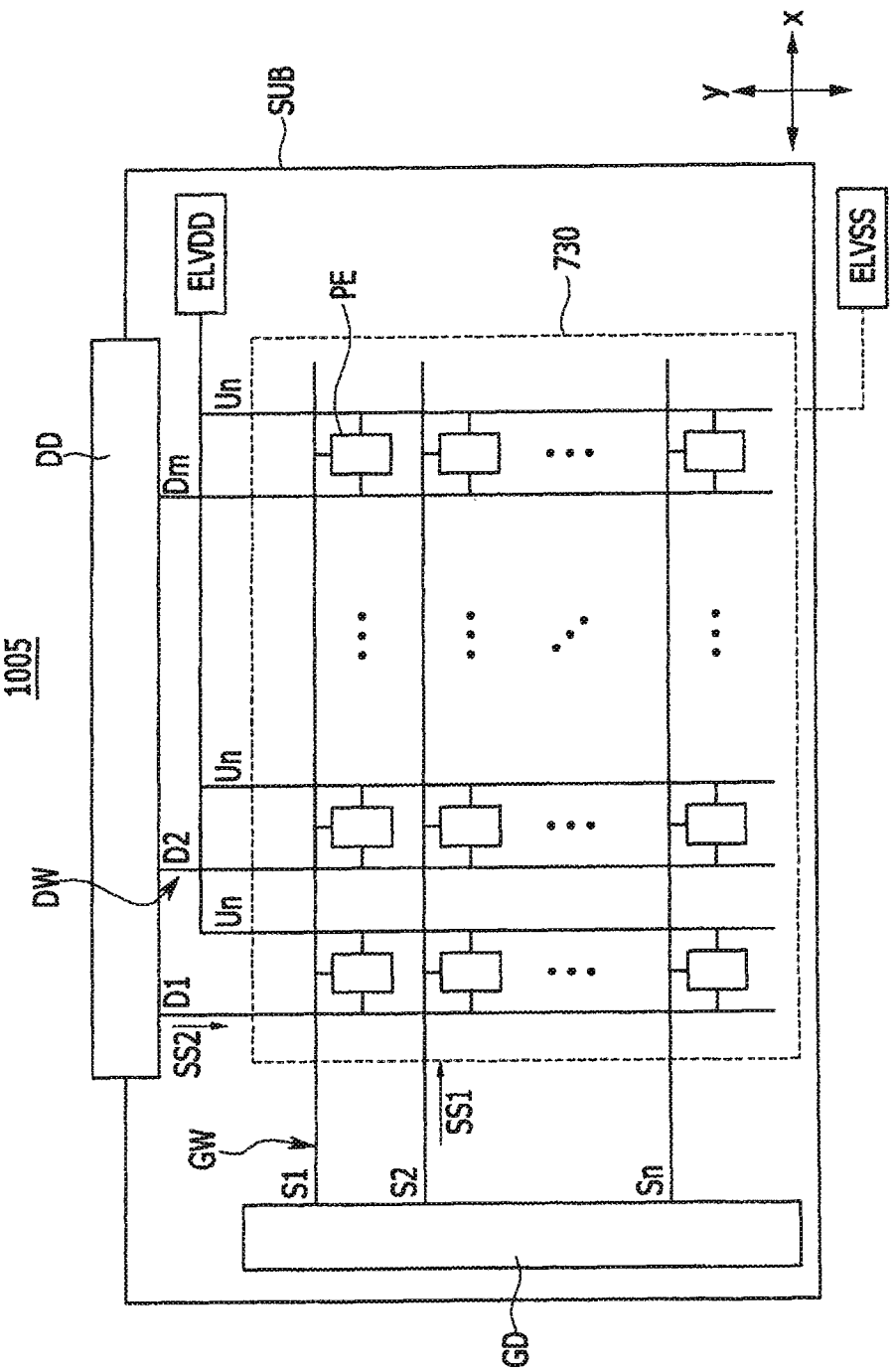
FIG. 11 is a view of a display device according to a fifth exemplary embodiment.

FIG. 11 is a view of the display device according to the fifth exemplary embodiment.

As shown in FIG. 11, the display device 1005 according to the fifth exemplary embodiment includes a flexible substrate SUB, a gate driver GD, gate wires GW, a data driver DD, data wires DW, and a pixel PE. Here, the pixel PE represents the minimum unit for displaying the image, and the display device 1005 displays the image through a plurality of pixels PE.

The gate driver GD sequentially supplies scan signals to the gate wires GW by corresponding to a control signal supplied from an external control circuit, for example, a control signal supplied from a timing controller. Then, the pixels PE are selected by the gate signal and sequentially receive data signals.

The gate wires GW include first lines S1-Sn, and the first line Sn is connected to the gate driver GD thereby receiving the gate signal from the gate driver GD.

The data driver DD supplies a data signal to a data line Dm among the data wires DM by corresponding to the control signal supplied from the external source such as a timing controller. The data signal supplied to the second line Dm is supplied to a pixel PE selected by a gate signal when the scan signal is supplied to the first line Sn. Then, the pixel PE changes a voltage corresponding to the data signal and emits light with luminance corresponding thereto.

The data wires DW are disposed on the gate wires GW, and are extended in a second direction (y) crossing the first direction (x). The data wires DW include the second lines D1-Dm and the driving power line Un. The second line Dm is connected to the data driver DD and receives the data signal from the data driver DD. The driving power line Un is connected to the first power source ELVDD and receives the driving power source from the first power source ELVDD. The second line Dm is adjacent to the first line Sn, and the second line Dm and the first line Sn are close to each other on different layers.

The pixel PE is provided at portions where the gate wires GW cross the data wires DW, and is connected to the gate wires GW and the data wires DW. The pixel PE includes thin film transistors and a capacitor connected to the first power source ELVDD, the gate wires GW, and the data wires DW, and an organic light emitting diode connected between the thin film transistors and a second power source ELVSS. The pixel PE is selected when the scan signal is supplied through the first line Sn, it charges the voltage corresponding to the data signal through the second line Dm, and it emits light with a set or predetermined luminance corresponding to the charged voltage. That is, the pixel PE is positioned at the position where the first line Sn and the second line Dm cross.

The gate driver GD selectively applies the first sensing signal SS1 to the first line Sn and measures the change of the crosstalk generated in the first line Sn by the second sensing signal SS2 according to the bending of the flexible substrate SUB.

The data driver DD applies the second sensing signal SS2 to the second line Dm and measures the change of the crosstalk generated in the second line Dm by the first sensing signal SS1 according to the bending of the flexible substrate SUB.

For example, in the state that the flexible substrate SUB is flat, the gate driver GD applies the first sensing signal SS1 to the first line Sn and the data driver DD measures the crosstalk generated in the second line Dm by the first sensing signal SS1. Next, if the flexible substrate SUB is bent in the second direction (y) while having the curved surface, the entire area of the first line Sn influencing the crosstalk to the second line Dm according to the bending of the flexible substrate SUB in the second direction (y) is decreased such that the crosstalk generated in the second line Dm by the first sensing signal SS1 applied to the first line Sn is deteriorated, and at this time, the data driver DD measures the change of the crosstalk to measure the bending degree of the flexible substrate SUB. At this time, the crosstalk generated in the second line Dm may be changed by the capacitance formed in the insulation layer between the first line Sn and the second line Dm.

Here, the first sensing signal SS1 may be the current or the voltage, and the data driver DD measures the change of the current or the voltage flowing in the second line Dm by the crosstalk generated by the first sensing signal SS1 applied to the first line Sn to measure the bending degree of the flexible substrate SUB.

As another example, firstly, in the state that the flexible substrate SUB is flat, the data driver DD selectively applies the second sensing signal SS2 to the second line Dm and the gate driver GD measures the crosstalk generated in the first line Sn by the second sensing signal SS2. Next, if the flexible substrate SUB is bent in the first direction (x) while having the curved surface, the entire area of the second line Dm influencing the crosstalk to the first line Sn according to the bending of the flexible substrate SUB in the first direction (x) is increased such that the crosstalk generated in the first line Sn by the second sensing signal SS2 applied to the second line Dm is increased, at this time, the gate driver GD measures the change of the crosstalk to measure the bending degree of the flexible substrate SUB. At this time, the crosstalk generated in the first line Sn may be changed by the capacitance formed in the insulation layer (IL) between the first line Sn and the second line Dm.

Here, the second sensing signal SS2 may be the current or the voltage, and the gate driver GD measures the change of the current or the voltage flowing in the first line Sn by the crosstalk generated by the second sensing signal SS2 applied to the second line Dm to measure the bending degree of the flexible substrate SUB.

As described above, the display device 1005 according to the fifth exemplary embodiment includes the first line Sn, the second line Dm, the gate driver GD, and the data driver DD and measures the crosstalk respectively generated in the first line Sn and the second line Dm to measure the bending degree of the flexible substrate SUB.

That is, the flexible display device 1005 may be intuitively driven according to the bending degree of the flexible substrate SUB such that the flexible display device 1005 driven by the bending of the flexible substrate SUB is provided.

Also, the flexible display device 1005 according to the fifth exemplary embodiment includes a plurality of the first lines Sn and second lines Dm, and the plurality of the first lines Sn and second lines Dm are disposed according to the second direction (y) and the first direction (x) such that the gate driver GD and the data driver DD may sense whether any portion is bent for the entire flexible substrate SUB. Accordingly, by bending any region of the entire flexible substrate SUB, this regional bending can be detected, and the flexible display device 1005 that is differently driven according to each region is provided.

Also, the display device 1005 according to the fifth exemplary embodiment selectively applies the first sensing signal SS1 and the second sensing signal SS2 to the first line Sn for applying the gate signal to the pixel PE and the second line Dm for applying the data signal to the pixel PE to measure the bending degree of the flexible substrate SUB, thereby measuring the bending degree of the flexible substrate SUB by the conventional wires without the formation of additional wires. This prevents an increase of the entire layout and also prevents the influence by the undesired crosstalk generated by the additional wire. That is, the manufacturing time and the manufacturing cost may be reduced, and also the display device 1005 with improved reliability is provided while still adding the function for measuring the bending degree of the flexible substrate SUB.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

Description of Certain Symbols flexible substrate SUB
first line 111
second line 112
first controller 113

What is claimed is:

1. A display device comprising:
   a flexible substrate;
   a first line positioned on the flexible substrate and connected to a pixel for displaying an image;
   a second line adjacent to the first line;
   a first pixel driver for applying a first sensing signal to the first line and measuring a change of a crosstalk generated in the second line by the first sensing signal according to a bending of the flexible substrate;
   a third line positioned on the flexible substrate, extending in a second direction crossing a first direction, and connected to the pixel;
   a fourth line adjacent to the third line and extending in the second direction; and
   a second pixel driver for applying a second sensing signal to the third line and measuring the crosstalk generated in the fourth line by the second sensing signal,
   wherein the first line and the second line extend in the first direction on the flexible substrate.

2. The display device of claim 1, wherein
the pixel is positioned at a portion where the first line and the third line cross.

3. The display device of claim 1, wherein
the third line and the fourth line are positioned with a same layer, and
the second pixel driver is configured to apply a data signal to the third line.

* * * * *